United States Patent
Crotty (12)

(10) Patent No.: US 6,391,177 B1
(45) Date of Patent: May 21, 2002

(54) HIGH TEMPERATURE CONTINUOUS ELECTRODIALYSIS OF ELECTROLESS PLATING SOLUTIONS

(76) Inventor: David Crotty, 31 Woodside Park Blvd., Pleasant Ridge, MI (US) 48069

( * ) Notice: Subject to any disclaimer, the term of this patent is extended or adjusted under 35 U.S.C. 154(b) by 0 days.

(21) Appl. No.: 09/788,766

(22) Filed: Feb. 20, 2001

(51) Int. Cl.[7] ............................................. C25B 15/00
(52) U.S. Cl. ..................................... 204/529; 204/519
(58) Field of Search ................................ 204/522, 523, 204/529, 633, 634, 519

(56) References Cited

U.S. PATENT DOCUMENTS

| | | | |
|---|---|---|---|
| 4,289,597 A | 9/1981 | Grenda | 204/180 R |
| 4,313,808 A | * 2/1982 | Idemoto et al. | 204/528 |
| 4,549,946 A | 10/1985 | Horn | 204/182.4 |
| 4,600,493 A | 7/1986 | Korngold | 204/301 |
| 4,752,373 A | 6/1988 | Korngold | 204/301 |
| 4,762,601 A | 8/1988 | Krulik et al. | 204/182.4 |
| 5,472,585 A | 12/1995 | Dinella et al. | 204/182.4 |
| 5,523,327 A | 6/1996 | Song et al. | 521/32 |

FOREIGN PATENT DOCUMENTS

| | | |
|---|---|---|
| EP | 0015737 A1 | 9/1980 |
| JP | 63007382 | 1/1988 |
| JP | 01240684 | 9/1989 |
| WO | WO 00/23637 | 4/2000 |

OTHER PUBLICATIONS

Electrodialysis of Electroless Nickel Baths Filed and Laboratory Results, David E. Crotty, Nov. 2000.

Electro Dialysis for Electroless Nickel—A New Concept for Extended Bath Life, Rainer Born, Jens Heydecke and Werner Richtering, Oct. 2000.

Advances in the Electrodialysis of Electroless Nickel Baths, David E. Crotty, Jan. 2001.

Measurements and Control in Ion Exchange Installations, Francis X. McGarvey and Sallie A. Fisher, Membrane Science and Desalination Special Issue, Measurements and Control in Water Desalination, pp. 403–424, vol. 59, Aug. 1986.

Electrodialysis Developments in France, Surface World, Nov. 2000, p 42.

Durable membranes Offer High Permselectivity for Industrial Processes, Sybron Chemicals Inc., No month and/or year provided.

Neosepta Ion–Exchange Membranes, Tokuyama Corp., No month and/or year provided.

Ion Exchange Membranes, Technical Data, Membranes International Inc., http://www.membranesintl.com/data.htm, No month and/or year provided.

Electrodialysis and Electrodialysis Reversal, American Water Works Association Manual M38, First Edition, 1999 No month and/or year provided.

* cited by examiner

Primary Examiner—Arun S. Phasge
Assistant Examiner—Thomas H. Parsons
(74) Attorney, Agent, or Firm—Carmody & Torrance LLP

(57) ABSTRACT

An electrodialytic cell and process for its use in regenerating electroless plating solutions, particularly nickel-hypophosphite electroless plating solutions, are disclosed. The process is capable of operating at high temperatures and in a continuous fashion such that the plating operation is not interrupted and the steady state condition in the plating bath is achieved.

17 Claims, 2 Drawing Sheets

HIGH TEMPERATURE CONTINUOUS ELECTRODIALYSIS OF ELECTROLESS PLATING SOLUTIONS

BACKGROUND OF THE INVENTION

1. Field of the Invention

This invention pertains to a process and a device for the electrodialytic regeneration of an electroless metal deposition solution, particularly electroless nickel-hypophosphite plating solutions.

2. Description of the Related Art

Electroless plating of substrates has been known for many years. Electroless deposition typically occurs over both metal and plastic substrates and is performed for both aesthetic and functional purposes. The most widely used electroless plating solutions are electroless copper and electroless nickel. Electroless plating with metals is based on an auto-catalytic process, in which dissolved metal ions are reduced to the metal by a reducing agent present in the deposition solution and thus deposited into the work piece to be plated. Generally, electroless plating solutions comprise a soluble source of the metal to be plated, a chelator capable of keeping the metal ions in solution and a chemical reducing agent. For instance, electroless copper plating solutions generally comprise copper sulfate or copper chloride (soluble source of copper ions), chelators such as EDTA, formaldehyde as a chemical reducing agent, and alkali metal hydroxide. Electroless nickel plating solutions generally comprise nickel sulfate or nickel chloride (soluble source of nickel ions), chelators such as gluconic, citric, malic or lactic acids, sodium hypophosphite (chemical reducing agent) and a pH adjuster such as ammonium hydroxide to adjust the pH to between 4 and 7. Electroless nickel solutions also deposit phosphorous, from the hypophosphite in solution, into the metal plated layer.

The following chemical equation describes the plating function of an electroless nickel-hypophosphite plating solution:

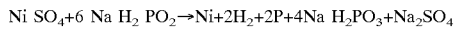

$$Ni\ SO_4 + 6\ Na\ H_2\ PO_2 \rightarrow Ni + 2H_2 + 2P + 4Na\ H_2PO_3 + Na_2SO_4$$

Thus in the plating, reaction, dissolved nickel ions and hypophosphite ions are consumed, while the concentration of the oxidation products, orthophosphite ($H_2\ PO_3$), and sodium sulfate increases in the solution. Although raw ingredients such as nickel sulfate and sodium hypophosphite are added back to the solution as plating continues to maintain the plating performance of solution, the build-up of by-products ultimately limits the useful life of the plating solution.

The age of a bath is typically stated in terms of the number of metal turnovers (MTO(s)) achieved by the solution. One MTO is achieved when the mass of metal plated out of the Solution equals the mass of metal in the original plating solution, without replenishment. For example, if a 100 liter plating bath has 6 g/l of nickel in the solution, then 1 MTO is achieved when a total of 600 gr. of nickel are plated out of the solution. Usually, when an electroless nickel hypophosphite plating solution reaches 6–10 MTO's, the by-products in the solution have reached such high levels that plating rate and quality are negatively affected to the point where the solution is no longer commercially useable. Therefore, once nickel-hypophosphite baths reach 6–10 MTO's they are no longer used, and the spent bath is discarded and replaced with a new bath, resulting in wasted materials, high costs and considerable environmental burden. As a result, various methods have been proposed for extending the useful life of these types of plating solutions.

U.S. Pat. No. 5,221,328 describes one such method where the by-product, orthophosphite, is precipitated out as an insoluble salt and removed in a batch mode. The precipitation agents, yttrium and lanthanides, however, are expensive and salts such as sodium sulfate continue to build in the plating solution. In another known method, ion exchange resins are used to separate the useful components (i.e. nickel and hypophosphite) from the by-products, in a batch operation, and the bath is then reconstituted.

U.S. Pat. No. 5,419,821 describes an electrodialytic process for the regeneration of electroless nickel-hypophosphite plating solutions. The solution to be regenerated is cooled and then conducted through a compartment in a electrodialytic cell which is separated from both the anode and cathode compartments by anion-exchange membranes. When an electrical field is applied, orthophosphate, hypophosphite and sulfates are transported through the anion exchange membrane into the anode compartment. The solution from the anode compartment is treated with calcium or magnesium salts to precipitate the orthophosphate and transported to the cathode compartment so that hypophosphite ions can be transported back into the plating solution. A disadvantage is that the interfering sodium and sulfate ions are not removed from the plating solution. In addition, the process is carried out in the batch mode.

Known regeneration processes suffer from the drawbacks that they fail to effectively remove or reduce the levels of all species of by-products, they are operated in a batch mode, and/or involve the addition of expensive precipitation agents. As a result, there exists a real need for a process that can reliably remove or reduce the levels of all species of by-products in a continuous operation at the same time that the solution is being used for plating so that plating is not interrupted with downtime for the regeneration and the solution is kept in a steady state condition. It is an object of this invention to disclose a regeneration process that meets the foregoing need.

BRIEF DESCRIPTION OF THE DRAWING

1—Electrode wash solution tank
2—Electroless plating solution tank
3—Waste salt tank
4—Electrode wash solution pump
5—Electroless plating solution pump
6—Waste salt pump
7—Anode
8—Cathode
9—Two electrode wash chambers
10—Plurality of waste salt chambers
11—Plurality of electroless plating solution chambers
12—Plurality of cation exchange membranes
13—Plurality of anion exchange membranes
14—Electrode wash solution delivery piping
15—Electrode wash solution return piping
16—Electroless delivery piping
17—Electroless return piping 18—Waste salt delivery piping 19—Waste salt return piping

7—Anode

8—Cathode

9—Two electrode wash chambers

10—Plurality of waste salt chambers

11—Electroless plating solution chamber

12—Plurality of cation exchange membranes

13—Anion exchange membrane

Figure 3:
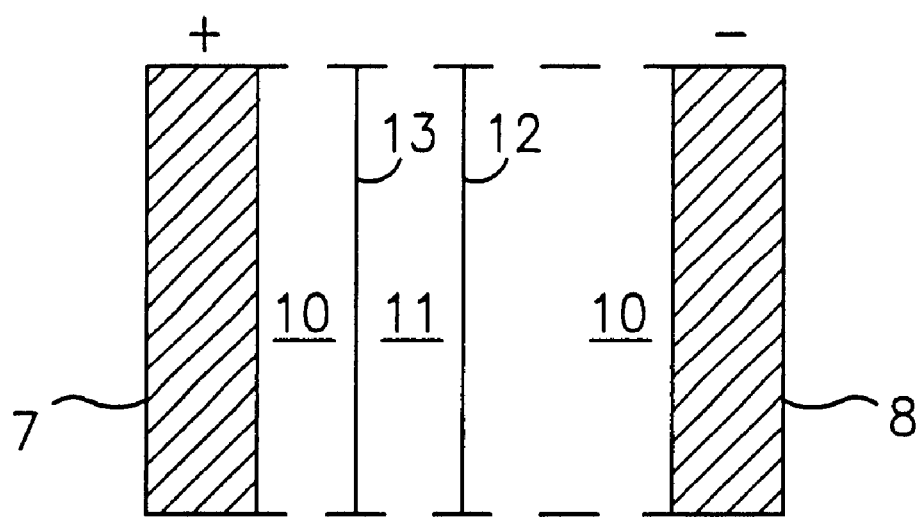

FIG. 3 represents the simplest possible electrodialytic cell of this type. The numbered components of FIG. 3 represent the following corresponding components of the electrodialytic cell described:

7—Anode

8—Cathode

10—Two waste salt chambers

11—Electroless plating solution chamber

12—Cation exchange membrane

13—Anion exchange membrane

In the case of FIG. 3, the electrode wash chambers have been eliminated (e.g. are the same as the waste salt chambers) and the waste salt solution is in direct contact with the anode and cathode.

SUMMARY OF THE INVENTION

This invention pertains to a process and device for the electrodialytic regeneration of electroless metal plating solutions, particularly electroless nickel-hypophosphite plating solutions. Referring to FIG. I, the proposed device comprises an electrodialytic cell comprising an anode (7) and a cathode (8) with a plurality of alternating anion exchange membranes (13) and cation exchange membranes (12), defining a plurality of liquid containing chambers (9, 10, and 11). The membrane closest to the anode (7) is a cation exchange membrane (12) and two membranes closest to the cathode (8) are preferably cation exchange membranes (12), with the remaining plurality of ion exchange membranes alternating from cation exchange membrane (12) to anion exchange membrane (13). The anode (7) and cathode (8) are connected to an electrical supply source (not shown) such that an electrical potential is set up between the anode (7), which is positive, and the cathode (8), which is negative.

The cation exchange membranes (12) and the anion exchange membranes (13) define a plurality of liquid filled chambers comprising two electrode wash chambers (9), a plurality of waste salt chambers (10), and a plurality of electroless plating solution chambers (11). One of each of the electrode wash chambers (9) are located directly adjacent to and in contact with the anode (7) and cathode (8) respectively. Directly adjacent to each electrode wash chamber (9) is a waste salt chamber (10) which is separated from the electrode wash chamber (9) by a cation exchange membrane (12). Directly adjacent to the waste salt chamber (10) nearest the anode (7), but on the opposite side, is an electroless plating solution chamber (11), which is separated from therefrom by an anion exchange membrane (13). Directly adjacent to the waste salt chamber (10) nearest the cathode (8), but on the opposite side, is an electroless plating solution chamber (11), which is separated therefrom by a cation exchange membrane (12). Proceeding inward towards the center of the cell then, are alternating anion exchange membranes (13) and cation exchange membranes (12), which define alternating waste salt chambers (10) and electroless plating solution chambers (11).

The electrode wash solution, contained in the electrode wash solution tank (1), is pumped by use of pump (4) through the electrode wash solution delivery piping (14) to the two electrode wash chambers (9) and is returned to the electrode wash solution tank (1) through the electrode wash solution return piping (15). The electroless plating solution, contained in the electroless plating solution tank (2), is pumped with pump (5) through the electroless delivery piping (16) to the plurality of electroless plating solution chambers (11) and is returned to the electroless plating solution tank (2) through the electroless return piping (17). The waste salt solution, contained in the waste salt tank (3), is pumped with pump (6) through the waste salt delivery piping (18) to the plurality of waste salt chambers (10), and is returned to the waste salt tank (3) through the waste salt return piping (19).

While the various solutions are being pumped through their respective chambers, an electrical potential is applied to between the anode (positive) and the cathode (negative). This electrical potential will cause anions in the electroless plating solution (orthophosphite and sulfate) to migrate from the electroless plating solution into the waste salt solution through anion exchange membranes (13) and cations in the electroless plating solution ($Na^+$) to migrate from the electroless plating solution into the waste salt solution through cation exchange membranes (12). Surprisingly it has been found that the larger chelated nickel species in the plating solution are not appreciably removed in this process. This electrodialytic regeneration process may proceed at the same time that the electroless plating solution is being used to plate parts in the electroless plating solution tank. Thus the plating process does not need to be interrupted as it would in batch regeneration processes. In addition, the electroless plating solution may be maintained in a chemical steady state condition, thereby increasing the reliability of the plating process.

DETAILED DESCRIPTION OF THE INVENTION

The inventors herein propose an improved process and device for the electrodialytic regeneration of electroless plating solutions, particularly nickel-hypophosphite electroless plating solutions. The process and device allow for the regeneration of electroless plating solutions without interrupting the plating process and may be carried at plating operating temperatures up to about 190° F.

The electrodialytic regeneration cell, of this invention, comprises:

(a) at least one anode and at least one cathode;

(b) a First electrode wash chamber bounded on one side by a face of the anode and on the opposite side by a first cation exchange membrane;

(c) a second electrode wash chamber bounded on one side by a face of the cathode and on the opposite side by a second cation exchange membrane;

(d) at least one waste salt chamber bounded on the anode side by a cation exchange membrane and the cathode side by an anion, exchange membrane;

(e) at least one electroless plating solution chamber, bounded on the anode side by an anion exchange membrane and on the cathode side by a cation exchange membrane; and (f) a power supply for the anode and cathode;

wherein the anode, the cathode, each chamber and each exchange membrane are disposed with their faces substantially parallel to each other. Preferably the waste salt chambers and the electroless plating solution chambers alternate with each other between the anode and the cathode. However, preferably, the waste salt chamber closest to the cathode (i.e. adjacent to the second electrode wash chamber) is bounded on both sides with cation exchange membranes.

The process involves simultaneously pumping the electroless plating solution, the electrode wash solution and the waste salt solution through the electroless plating solution chambers, the electrode wash chambers and the waste salt chambers respectively while applying an electrical potential between the anode (positive) and the cathode (negative).

The anode (7) is preferably a flat metal sheet comprised of an inert metal or surface which will not dissolve in the electrode wash solution under anodic potential (positive). Examples include anodes made of tungsten. titanium, platinized titanium, and titanium coated with iridium and/or ruthenium oxides. The objective is for the anode to be able to perform anodically in the electrode wash solution without dissolving or deteriorating the anode surface. The anode material should be as conductive as possible for optimum electrical efficiency. As a result, platinized titanium or iridium oxide/ruthenium oxide coated titanium are preferred for high conductivity and inertness. The anode is connected to the positive side of the electrical power source.

The cathode (8) is also preferably a flat metal sheet comprised of an inert metal or surface which will not be degraded in the electrode wash solution. Examples include platinized titanium, tungsten, titanium and stainless steel (preferably 316 stainless steel). As with the anode, the cathode material should be as conductive as possible for optimum electrical efficiency. 316 stainless steel is preferred. The cathode is connected to the negative side of the electrical power source.

The cation exchange membranes (12) are comprised of fabric impregnated with cation exchange media. These cation exchange membranes transport cations (e.g. sodium) through the membrane based upon concentration gradients and/or electrical potential, but resist the transport of anions and non-cationic species. Although a variety of cation exchange membranes can be used, the inventor has found that SYBRON IONAC ® cation exchange membranes, available from Sybron Chemicals, Inc. of Birmingham, N.J. are preferred because of their good physical strength, high selectivity and ability to operate at high temperatures. The inventor has found SYBRON IONAC ® MC-3470 to be particularly useful in the electrodialytic cell of this invention. Other potentially suitable cation exchange membranes are the CMI-7000 cation exchange membranes available from Membranes International, Inc. of Glen Rock, N.J. These CMI-7000 membranes sold under the ULTREX® tradename have been found to be stable at temperatures of up to 100° C. Some cation exchange membranes are selective as to the number of charges on the cations they transport. In this regard, monoselective cation exchange membranes may provide advantages in transporting the singly valent sodium by-products through the membrane to the waste salt solution while retarding the similar transport of divalent nickel or copper. However, the inventors have discovered that the chelated copper or nickel species in the electroless plating solution are not effectively transported through cation exchange membranes such as SYBRON IONAC ® MC-3470, most likely because of the relatively large size of the chelated copper or nickel species in comparison to sodium and the effects of chelation on the charge of the overall species.

The anion exchange membranes (13) are comprised of fabric impregnated with anion exchange media. These anion exchange membranes transport anions (e.g. orthophosphite and sulfate) through the membrane based upon concentration gradients and/or electrical potential, but resist the transport of cations and non-anionic species. Although a variety of anion exchange membranes can be used, the inventor has found that SYBRON IONAC ® anion exchange membranes, available from Sybron Chemicals, Inc. of Birmingham, N.J. are preferred because of their good physical strength, high selectivity and ability to operate at high temperatures. The inventor has found SYBRON IONAC ® MC-3475 to be particularly useful in the electrodialytic cell of this invention. Other potentially suitable anion exchange membranes are ULTREX® AMI-7001, available from Membranes International, Inc. which have been found stable at temperatures up to 100° C.

The inventor has found that ion exchange membranes used preferably have Mullen Burst Test strengths of at least 100 psi, more preferably at least 130 psi, and most preferably at least about 150 psi. Preferably the ion exchange membranes have an area resistance less than about 50 ohms/cm$^2$, a permselectivity of at least about 95 (0.5 N NaCl/1.0 N NaCl) and water permeability of less than about 25 ml/hr/ft$^2$/psi. Preferably the ion exchange membranes are stable at temperatures up to about 80° C. This temperature stability is important for the continuous electrodialysis of the plating solution since plating solutions operate at temperatures up to 190° F. The temperature stability of the membranes must be such that they retain their physical integrity at these temperatures and maintain their ability to selectively transport ions at these temperatures.

Figure 1:
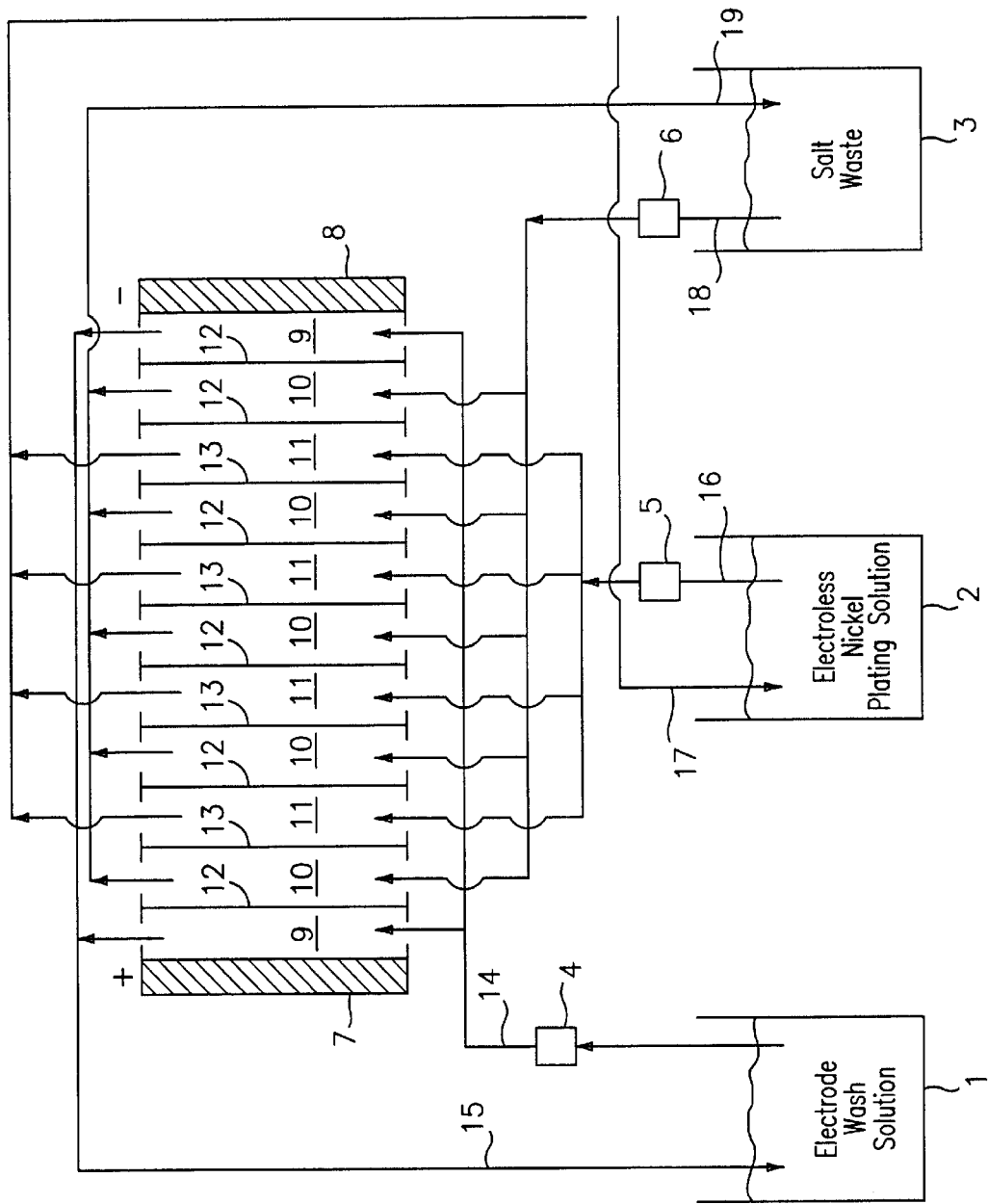
FIG. 1 represents a schematic/flow diagram for the electrodialytic regeneration unit of this invention. The numbered components of FIG. 1 represent the following corresponding components of the electrodialytic regeneration unit of this invention.
Figure 2:
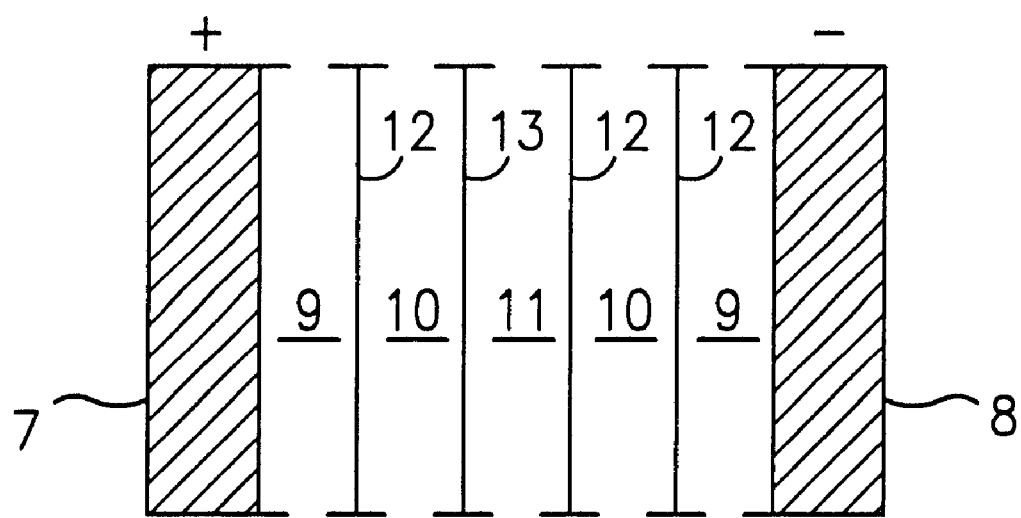
FIG. 2 represents the simplest preferred electrodialytic cell of this invention. The numbered components of FIG. 2 represent the following corresponding components of the electrodialytic regeneration unit of this invention.

The electrode wash solution is preferably a conductive aqueous solution that is compatible with both the anode and cathode (i.e. does not degrade the surfaces of either the anode or the cathode in operation). The electrode wash solution also preferably has components in it that are also found in the electroless plating solution, including the by-products of the plating reaction. As a result, the electrode wash solution may be the same as the waste salt solution or it may be different. In the case where the electrode wash solution is the same as the waste salt solution then the separate electrode wash tank (1), pump (4), electrode wash delivery piping (14) and electrode wash return piping (15) are not needed and the electrode wash chamber areas are supplied with waste salt solution, in essence becoming waste salt chambers. This arrangement simplifies the electrodialytic cell from comprising three types of compartments to comprising essentially two types of compartments. However, the inventor has found it most advantageous to maintain the electrode wash solution separate from the waste salt solution as shown in FIG. 1. In this case, the electrode wash solution preferably comprises an aqueous solution of sodium sulfate. The sodium sulfate solution provides conductivity but does not provide any species that will plate out on the cathode. If used, the concentration of sodium sulfate may range from 1 to 200 g/l but is preferably from 5 to 15 g/l.

As noted the electrode wash chambers are located adjacent to the anode and the cathode and are bounded on one side by the anode and cathode respectively and on the other side by cation exchange membranes. The top, bottom and outer walls of the electrode wash chambers, as with the other chambers, are appropriately sealed so that the electrode wash solution can be effectively contained in and pumped through the electrode wash chamber.

Preferably all but one of the waste salt chambers are bounded on the anode side by a cation exchange membrane and on the cathode side by an anion exchange membrane. Preferably, the waste salt chamber nearest the cathode and adjacent to the cathode electrode wash chamber is bounded on both sides by cation exchange membranes, so that the electrode wash solution salts do not migrate into the waste salt solution. In the case where the waste salt solution and the electrode wash solution are the same, then this particular waste salt chamber bounded on both sides by cation exchange membranes is not needed and the electrode wash chambers function as waste salt chambers. Preferably there are a plurality of waste salt chambers disposed in the electrodialytic cell, since increasing the number of alternating waste salt chambers and electroless plating solution chambers increases the transfer area and therefore the overall electrodialytic capacity of the cell. The top, bottom, and outer walls of the waste salt chambers are appropriately sealed so that the waste salt solution can be effectively contained in and pumped through the waste salt chambers. The waste salt solution preferably begins as water. As the electrodialytic process proceeds, the waste salt solution (water) will build in concentration with sodium, orthophosphite and sulfate. The waste salt solution should be changed regularly for optimum electrodialytic performance.

Each of the electroless plating solution chambers are bounded on the anode side by an anion exchange membrane and on the cathode side by a cation exchange membrane. As noted the electroless plating solution chambers alternate with the waste salt chambers. The top, bottom, and outer walls of the electroless plating solution chambers are appropriately sealed so that the electroless plating solution can effectively be contained in and pumped through the electroless plating solution chambers.

The anode is electrically connected to the positive side of the electric power source (rectifier) and the cathode is connected to the negative side. An electrical potential is then applied to setup an electric field between the anode and the cathode. The amount of voltage and power necessary depends upon the type and size of the anode and cathode, the number of alternating chambers and ion exchange membranes, the overall distance between the anode and cathode and the conductivity of the various solutions involved. The electrode wash solution, the electroless plating solution and the waste salt solution are each maintained in separate tanks and separately pumped into their separate chambers continuously through separate piping systems.

The main object of the process is the removal of the interfering plating by-products without equally removing the essential plating ingredients. In the case of an electroless nickel-hypophosphite plating solution, the interfering by-products to be removed are sodium ions, orthophosphite ions, and sulfate ions. This removal of interfering by-products should be accomplished substantially without the concurrent removal of the essential plating ingredients, nickel, chelator(s) and hypophosphite.

An explanation of the process of the invention can most easily be understood by reference to Figure II. Thus the electrode wash solution is pumped through the two electrode wash chambers (9), the waste salt solution is pumped through the two waste salt chambers (10), and the electroless plating solution is pumped through the electroless plating solution chamber (11), all while an electrical potential is applied between the anode (positive) and the cathode (negative). The electrical potential will cause anions in the electroless plating solution to be attracted towards the anode and cations towards the cathode. As a matter of electrical balance, the number of positive charges which pass from the electroless plating solution towards the cathode must equal the number of negative charges passing towards the anode. Assuming the electroless plating solution is a used nickel-hypophosphite electroless plating solution comprising the following beneficial ingredients and interfering by-products:

| Beneficial Ingredients | Interfering By-Products |
|---|---|
| $NiSO_4$ | $Na_2SO_4$ |
| $NaH_2PO_2$ | $NaH_2PO_3$ |
| Chelators (generally carboxylic acids) | | then the sulfate, hypophosphite and orthophosphite will be attracted towards the anode and the nickel and sodium will be attracted towards the cathode. The sulfate, hypophosphite and orthophosphite will migrate through the anion exchange membrane, (13), on the anode side of the electroless plating solution chamber (11) into the waste salt chamber (10). The relatively small sulfate ions will migrate through the anion exchange membrane (13) readily. The orthophosphite ions will beneficially migrate through anion exchange membrane (13) more quickly than the hypophosphite ions because it will be more strongly attracted, to the anode than hypophosphite, and the concentration of orthophosphite in a well used electroless nickel plating solution (e.g. about 8 MTO's) will be approximately 8 times higher than the concentration of hypophosphite. Thus the interfering anion by-products will be removed at a faster rate than beneficial anion ingredients such as hypophosphite. Anions from the waste salt chamber (10) closest to the anode (7) will not penetrate into the electrode wash chamber (9) because of the cation exchange membrane (12) adjacent to the anode (7). In addition, cations repelled by the anode (7) will not penetrate into the electroless plating solution chamber (11) because of anion exchange membrane (13). Other contaminate anions in the electroless plating solution will be removed similarly.

The sodium and nickel cations in electroless plating solution chamber (11) will be attracted toward the cathode (8). They will both migrate through cation exchange membrane (12) on the cathode side of the electroless plating solution chamber (11) into the waste salt chamber (10) nearest the cathode (8). However, while the small sodium ions will migrate readily, the larger chelated nickel ions will migrate much more slowly. Anions repelled by the cathode (8) will not migrate into the electroless plating solution chamber (11) because of cation exchange membranes (12). Cations in the waste salt chamber (10) closest to the cathode (8) will migrate into the electrode wash chamber (9). Other contaminate cations in the electroless plating solution will be removed similarly.

The waste salt solution pumped through waste salt chambers (10) preferably starts as water but quickly builds in salts from the electrodialysis operation. Thus, the waste salt solution must be changed regularly or continuously fed with clean water in order to maintain the salt concentration at low levels, thereby improving the efficiency of the electrodialytic cell. Maintaining separate waste salt solutions and electrode wash solutions will allow the electrode wash solutions to contain relatively high levels of salts at all times for conductivity while the waste salt solutions contain low levels of salts to improve efficiency. In addition, the electrode wash solution will preferably be formulated so that any nickel ions driven into the electrode wash solution will not adherently plate out on the cathode.

As noted, the electrodialysis is preferably carried out on the electroless plating solution in a continuous manner at the same time as, and without interrupting, the plating process. Thus, preferably the electroless plating solution is maintained at a steady state, chemically, by removing by-products through electrodialysis while at the same time analyzing for and replenishing the beneficial ingredients. The inventor has found that in this manner, the life of the electroless plating solution can be greatly extended while the reliability and reproducibility of the plating performance is improved.

The larger the surface area of the ion exchange membranes used in the electrodialytic cell, the more effective the regeneration of the electroless plating solution will be. Thus in its most preferred embodiment, the electrodialytic cell of this invention comprises:

(a) at least one anode and at least one cathode each disposed at opposite ends of the cell;

(b) a first electrode wash chamber bounded on one side by a face of the anode and on the opposite side by a first cation exchange membrane;

(c) a second electrode wash chamber bounded on one side by a face of the cathode and on the opposite side by a second cation exchange membrane;

(d) at least one waste salt chamber disposed between the anode and the cathode, and bounded on the anode side by a cation exchange membrane and on the cathode side by an anion exchange membrane;

(e) at least one electroless plating solution chamber disposed between the anode and the cathode, and bounded on the anode side by an anion exchange membrane and on the cathode side by a cation exchange membrane; and (f) a power supply for the anode and cathode; wherein the anode, the cathode, each chamber and each exchange membrane are disposed with their faces substantially parallel to each other and wherein to the waste salt chambers and the electroless plating solution chambers alternate with each other between the anode and the cathode. However, preferably, the waste salt chamber closest to the cathode (i.e. adjacent to the second electrode wash chamber) is bounded on both sides with cation exchange membranes. Thus, most preferably the cell will comprise a plurality of waste salt chambers and a plurality electroless plating solution chambers so that the ion exchange area can be maximized. This configuration also allows for maintaining separate electrode wash and waste salt solutions and the noted advantages that come with that.

However, it is possible to construct a simpler electrodialysis cell which does not have separate electrode wash chambers. In this case, the electrodialysis cell will comprise:

(a) at least one anode and at least one cathode, each disposed at opposite ends of the cell;

(b) an anode waste salt chamber bounded on one side by a face of the anode and on the opposite side by an anion exchange membrane;

(c) a cathode waste salt chamber bounded on one side by a face of the cathode and on the opposite side by a cation exchange membrane;

(d) optionally, but preferably a plurality of waste salt chambers, disposed between the anode and the cathode, and bounded on the anode side by a cation exchange membrane and on the cathode side by an anion exchange membrane;

(e) at least one, and preferably a plurality of, electroless plating solution chamber(s) bounded on the anode side by an anion exchange membrane and on the cathode side by a cation exchange;

(f) an electrical power supply for the anode and cathode; wherein the anode, cathode, each chamber and each exchange membrane, are disposed with their faces substantially parallel to each other.

Regardless of electrolytic cell design, this invention is preferably carried out by pumping the electroless plating solution through the electroless plating solution chamber(s), the waste salt solution through the waste salt chambers and, if used, the electrode wash solution through the electrode wash chambers, all while applying an electrical potential between the anode and the cathode. This process is preferably carried out while the electroless plating solution is being used to plate parts and the beneficial ingredients in the electroless plating solution are being analyzed and replenished. Most preferably the beneficial ingredients of the electroless plating solution (e.g. nickel, hypophosphite, and chelators) are analyzed on a continuous or semi-continuous (repeated) basis and the necessary replenishments are continuously metered into the electroless plating solution such that steady state is most nearly achieved.

The electrodialytic cell is provided with seals for holding the membranes in place and for preventing liquid leakage between or from the chambers. Seals are preferably constructed of santoprene or equivalent. The top, bottom and sides of the electrodialytic cell are capped with temperature resistant plastic or plastic coated steel sheets, such that the chambers are effectively contained. The entire stack is held together by bolts, which extend all the way through the stack. Alternatively, the stack can also be clamped together by hydraulic devices.

The piping and tanks are preferably constructed of temperature resistant plastic. The pumps can be appropriately-sized centrifugal pumps.

The invention is further described by the following example which should be taken as illustrative but not limiting in any manner.

EXAMPLE I

An electrodialysis cell was used to regenerate an electroless nickel-hypophosphite plating solution while the solution was simultaneously used to plate parts. The electrodialysis cell comprised the following components, which were disposed substantially parallel to each other. Proceeding from the anode at one end to the cathode at the other end, those components comprised: (i) anode, (ii) electrode wash chamber; (iii) cation exchange membrane, (iv) waste salt chamber, (v) anion exchange membrane, (vi) electroless plating solution chamber, (vii) cation exchange membrane; (viii) waste salt chamber; (ix) anion exchange membrane; (x) electroless plating solution chamber; (xii) cation exchange membrane; (xiii) waste salt chamber; (xiv) cation exchange membrane; (xv) electrode wash chamber and (xvi) cathode.

The anode was a sheet of iridium oxide coated titanium. The cathode was a sheet of 316 stainless steel. Each cation exchange membrane was a SYBRON IONAC ® MC-3470 membrane available from the Sybron Chemical Company of Birmingham, N.J. Each anion exchange membrane was a SYBRON IONAC ® MC-3475 membrane. The electrode wash solution was initially an aqueous solution of 10 g/l sodium sulfate. The waste salt solution was initially water.

The electroless plating solution had already been used to plate about 4 MTO's and was initially analyzed to have the following composition:

| Analyzed Component | Concentration |
|---|---|
| Hypophosphite | 33.9 g/l |
| Orthophosphite | 117 g/l |
| Nickel | 6 g/l |
| Lead | 1.2 ppm |

Each of the three solutions were pumped through their respective chambers while an electrical potential of approximately 40 volts was applied between the anode and cathode. At the same time the 57 liters of electroless nickel plating solution was used to continue to plate parts. The electroless nickel plating solution was repeatedly analyzed for hypophosphite, orthophosphite, nickel, lead and chelator level and appropriate replenishments were made in order to maintain nickel at 6 g/l, hypophosphite at 25–35 g/l, chelator at 95–120 g/l and lead at 0.8–1.5 ppm. The following table shows how the bath continued to age:

TABLE I

HIGH TEMPERATURE ELECTRODIALYSIS

| Load | MTO[1] | Amp Hrs. | Rate[2] | Ni Used Gm | Hypo Used Gm | % M[3] | % L[4] | Pb PPM | Hypo G/L | Ortho G/L | Ortho Removal Gm/A.H | Add Ratio | Waste Salt Tank |
|---|---|---|---|---|---|---|---|---|---|---|---|---|---|
| 0 | 0 |  |  |  |  | 109 | 132 | 1.2 | 33.9 | 117 |  |  |  |
| 1 | 0.3 | 19.5 | 0.58 | 121 | 709 | 104 | 126 |  | 32.1 | 110 | 36 | 1:1 | Nodump |
| 2 | 0.55 | 24.5 | 0.56 | 103 | 865 | 101 | 122 |  | 26.0 | 113 | 35 | 1:1 | Dump |
| 3 | 0.85 | 25.4 | 0.59 | 123 | 743 | 99 | 120 | 1.9 | 30.5 | 112 | 29 | 1:1.2 | Dump |
| 4 | 1.24 | 35.0 |  | 160 | 958 | 99 | 118 |  | 28.5 | 112 | 26 | 1:1.2 | Nodump |
| 5 | 1.87 | 64 | 0.60 | 262 | 1573 | 95 | 113 |  | 27.8 | 113 | 21 | 1:1.2 | Nodump |
| 6 | 2.34 | 52 |  | 194 | 1158 | 92 133 | 109 155 | 1.2 | 28.8 | 110 | 14 | 1:1.2 | Nodump Dump |
| 7 | 2.87 | 36 | 0.58 | 218 | 1311 | 125 | 141 |  | 30 | 95 | 36 | 1:1.1 | Nodump |
| 8 | 3.28 | 47 | 0.53 | 167 | 1000 | 108 | 121 |  | 23 | 98 | 20 | 1:1.1 | Nodump |
| 9 | 3.63 | 49 | 0.52 | 143 | 856 | 97 | 115 |  | 29 | 100 | 9 | 1:1.1 | Nodump |
| 10 | 3.92 | 47 | 0.57 | 120 | 727 | 112 | 120 | 1.3 | 26 | 110 | 10 | 1:1.1 | Nodump |

Notes:
[1]MTO's reported do not include the approximately 4 MTO's plated prior to the start of this experiment.
[2]Rate is the plating rate expressed as mils/hour.
[3]% M is the percentage of one chelator based upon that chelator concentration at initial make-up.
[4]% L is the percentage of a second chelator based upon that chelator concentration at initial make-up.

The operating conditions during this experiment were:

Electroless nickel plating temperature—90° C.

Electrodialysis cell temperature—70–80° C.

Flow rate—1–2 l/min

D.C. volts—40

D.C. amps—7–8

As can be seen from the data, the concentration of orthophosphite remained essentially constant during the experiment despite that fact that 3.92 additional MTO's were put on the plating solution which should have raised the orthophosphite concentration by about an additional 100 g/l. In addition, the plating rate remained essentially constant over the experiment. An analysis of the orthophosphite removal rate (g/amp.hr) shows that the removal rate decreased as the waste salt solution became more contaminated. Thus controlled dilution or dumping of the waste salt solution is important to the efficiency of the electrodialysis. By the end of the experiment the plating bath remained in essentially as good a condition as it was at the beginning.

What is claimed is:

1. A process for regenerating an electroless plating bath, said process comprising:
(i) pumping the plating bath through an electrodialytic cell comprising:
(a) at least one anode and at least one cathode, each disposed at opposite ends of the cell;
(b) a first electrode wash chamber bounded on one side by a face of the anode and on the opposite side by a first cation exchange membrane;
(c) a second electrode wash chamber bounded on one side by a face of the cathode and on the opposite side by a second cation exchange membrane;
(d) at least one waste salt chamber, disposed between the anode and the cathode, and bounded on the anode side by a cation exchange membrane and on the cathode side by an anion exchange membrane;
(e) at least one electroless plating solution chamber, disposed between the anode and the cathode, and bounded on the anode side by an anion exchange membrane and on the cathode side by a cation exchange membrane; and
(f) an electrical power supply connected to the anode and cathode;

wherein the anode, the cathode, each chamber and each exchange membrane are disposed with their faces substantially parallel to each other and wherein the waste salt chambers and the electroless plating solution chambers alternate with each other between the anode and the cathode;

wherein an electrical potential is applied between the anode and the cathode;

(ii) repeatedly determining the concentration levels of at least some of the ingredients of the plating bath;
(iii) adding materials to the plating bath in order to replenish consumption of at least some ingredients thereof; and
(iv) plating metal out of the plating bath.

2. A process according to claim 1, wherein the plating bath is a nickel-hypophosphite plating bath.

3. A process according to claim 1, wherein the electrolytic cell also comprises a cathode waste salt chamber, disposed directly adjacent to the second electrode wash chamber, and bounded on both sides by cation exchange membranes, and wherein the cathode waste salt chamber and the cation exchange membranes are disposed substantially parallel to each other and to the cathode.

4. A process according to claim 3, wherein the electrodialytic cell comprises a plurality of waste salt chambers and a plurality of electroless plating solution chambers.

5. A process according to claim 3, wherein the anode comprises a material selected from the group consisting of platinized titanium, iridium oxide coated titanium, ruthenium oxide coated titanium and tungsten.

6. A process according to claim 3, wherein the ion exchange membranes have a Mullen Burst Test strength of at least about 150 psi.

7. A process according to claim 3, wherein the ion exchange membranes are stable in temperatures up to about 80° C.

8. A process according to claim 3, wherein the plating bath is an electroless nickel-hypophosphite plating bath.

9. A process according to claim 1, wherein the electrolytic cell comprises a plurality of waste salt chambers and a plurality of electroless plating solution chambers.

10. A process according to claim 1, wherein the anode comprises a material selected from the group consisting of platinized titanium, iridium oxide coated titanium, ruthenium oxide coated titanium and tungsten.

11. A process according to claim 1, wherein the ion exchange membranes have a Mullen Burst Test strength of at least about 150 psi.

12. A process according to claim 1, wherein the ion exchange membranes are stable in temperatures up to about 80° C.

13. A process for regenerating an electroless plating bath, said process comprising:
  (i) pumping the plating bath through an electrodialytic cell comprising:
    (a) at least one anode and at least one cathode, each disposed at opposite ends of the cell;
    (b) an anode waste salt chamber bounded on one side by a face of the anode and on the opposite side by an anion exchange membrane;
    (c) a cathode waste salt chamber bounded on one side by a face of the cathode and on the opposite side by a cation exchange membrane;
    (d) optionally, a plurality of waste salt chambers, disposed between the anode and the cathode, and bounded on the anode side by a cation exchange membrane and on the cathode side by an anion exchange membrane;
    (e) at least one electroless plating solution chamber, disposed between the anode and the cathode, and bounded on the anode side by an anion exchange membrane and on the cathode side by a cation exchange membrane; and
    (f) an electrical power supply connected to the anode and the cathode;
  wherein the anode, the cathode, each chamber, and each exchange membrane are disposed with their faces substantially parallel to each other and wherein the waste salt chambers and the electroless plating solution chambers alternate with each other between the anode and the cathode;
  (ii) repeatedly determining the concentration levels of at least some of the ingredients of the plating bath;
  (iii) adding materials to the plating bath in order to replenish consumption of at least some ingredients thereof; and
  (iv) plating metal out of the plating bath.

14. A process according to claim 13, wherein the plating bath is a nickel-hypophosphite plating bath.

15. A process according to claim 13, wherein the anode comprises a material selected from the group consisting of platinized titanium, iridium oxide coated titantium, ruthenium oxide coated titanium and tungsten.

16. A process according to claim 13, wherein the ion exchange membranes have a Mullen Burst Test strength of at least about 150 psi.

17. A process according to claim 13, wherein the ion exchange membranes are stable in temperatures up to about 80° C. and have a water permeability of less than about 25 ml/hr/ft$^2$/psi.

* * * * *